(12) United States Patent
Lee et al.

(10) Patent No.: US 9,655,358 B2
(45) Date of Patent: May 23, 2017

(54) APPARATUS FOR REPELLING BIRDS

(71) Applicant: SEOUL METROPOLITAN GOVERNMENT, Seoul (KR)

(72) Inventors: Jong-Euk Lee, Gyeonggi-do (KR); Ji-Hwan Kim, Seoul (KR); Dong-Heon Shin, Gyeonggi-do (KR)

(73) Assignee: SEOUL METROPOLITAN GOVERMENT, Seoul (KR)

( * ) Notice: Subject to any disclaimer, the term of this patent is extended or adjusted under 35 U.S.C. 154(b) by 352 days.

(21) Appl. No.: 14/631,663

(22) Filed: Feb. 25, 2015

(65) Prior Publication Data
US 2015/0335006 A1 Nov. 26, 2015

(30) Foreign Application Priority Data
May 22, 2014 (KR) .......................... 10-2014-0061700

(51) Int. Cl.
| | |
|---|---|
| *A01M 29/00* | (2011.01) |
| *A01M 29/22* | (2011.01) |
| *A01K 29/00* | (2006.01) |
| *E04B 1/72* | (2006.01) |
| *A01M 29/32* | (2011.01) |

(52) U.S. Cl.
CPC .............. *A01M 29/22* (2013.01); *A01K 29/00* (2013.01); *A01M 29/32* (2013.01); *E04B 1/72* (2013.01)

(58) Field of Classification Search
CPC ...... A01M 29/00; A01M 29/24; A01M 29/26; A01M 29/30

USPC .............. 119/713, 82; 52/782.1, 506, 506.6; 49/55, 56, 58–60

See application file for complete search history.

(56) References Cited

U.S. PATENT DOCUMENTS

| 2,605,565 | A | * | 8/1952 | Meyer, Jr. | ............ | H01B 17/145 |
| | | | | | | 119/502 |
| 4,162,590 | A | * | 7/1979 | Earley | ....................... | E06B 9/01 |
| | | | | | | 49/55 |
| 5,081,958 | A | * | 1/1992 | Quisenberry | ............ | A01K 3/00 |
| | | | | | | 119/840 |

(Continued)

Primary Examiner — Richard Price, Jr.
(74) Attorney, Agent, or Firm — Moore & Van Allen PLLC; Henry B. Ward, III (57) ABSTRACT

Disclosed is an apparatus for repelling birds that can be readily installed on a structure and effective in repelling birds. To fundamentally prevent the birds from perching on the structure, the apparatus for repelling birds in accordance with an embodiment of the present invention includes: a fastening means including a first supporting part, a second supporting part and a fastening part interposed between the first supporting part and the second supporting part, and having the first supporting part and the second supporting part protruded in a same direction from either end of the fastening part in such a way that a protruded structure is fitted therein; a stopper being engaged with one of the first supporting part and the second supporting part in such a way that the fastening means is fastened to the structure after the fastening means is fitted on the structure, the stopper being at least one bolt; a supporting means being installed on the fastening means; a wire having at least one end coupled to the supporting means; and a tension adjusting means being installed at a portion where the wire is coupled with the supporting means.

4 Claims, 7 Drawing Sheets

(56) References Cited

U.S. PATENT DOCUMENTS 8,898,957 B2 * 12/2014 Morrone, III .......... E06B 9/063
49/55

* cited by examiner

APPARATUS FOR REPELLING BIRDS

CROSS-REFERENCE TO RELATED APPLICATIONS

This application claims the benefit of Korean Patent Application No. 10-2014-0061700, filed with the Korean Intellectual Property Office on May 22, 2014, the disclosure of which is incorporated herein by reference in its entirety.

BACKGROUND

1. Technical Field

The present invention relates to an apparatus for repelling birds, more specifically to an apparatus for repelling birds that, by installing a structure in such a way that birds may not perch thereon, can prevent avian excreta from ruining the appearance of the structure or causing a corrosion or damage to the structure.

2. Background Art

Having evolved to be as light as possible in order to fly around, avian species excrete bodily wastes at any time and do not keep the bodily wastes in the body. In the course of such an evolution, the bladder has become vestigial because there is no need to keep urine within the body, and there is nearly no large intestine. Moreover, in order to drink water as infrequently as possible, urine and feces are hardly distinguishable and are excreted in a mixed form.

Urine, which plays an important role of discharging the substances absorbed into an animal body, becomes ammonia when nitrogenous components are digested. Since ammonia is toxic, the mammalian liver resolves ammonia to the nontoxic urea, which is then dissolved in and discharged with urine.

However, it takes a long time and a large amount of energy to make urea despite its nontoxicity, birds discharge ammonia in the form of uric acid instead of urea. While uric acid is more toxic than urea, it has a higher nitrogen content per unit mass and thus has a higher efficiency of discharge. Moreover, since most avian species are carnivorous in order to supply the required energy, they discharge a relatively large amount of nitrogenous components compared to their body weights. As a result, birds do not keep the toxic uric acid in the bladder but discharge the uric acid as soon as it is formed, and thus the avian excreta contain uric acid.

Accordingly, corrosion is occurred when the avian excreta is landed on a bridge or a steel structure. Moreover, the appearances of the bridge or steel structure are ruined when the avian excreta is accumulated on the bridge or steel structure.

There have been some devices to repel the birds in order to solve the aforementioned problems, but these devices have taken a long time for installation and have been ineffective compared to the costs of installation.

Particularly, to keep the birds from approaching the bridges, sharp needle strips have been installed in areas where birds are frequented, bird repellents have been placed to discharge odors that birds dislike, or nets have been installed to keep away the birds. Nonetheless, these structures have hardly matched with their surroundings, had to be replaced every so often, for example every 2 years in the case of the bird repellents in order to maintain their gel state, or been very costly to maintain and reassemble.

The related art of the present invention is disclosed in Korea Patent No. 10-1178917 (published on Sep. 5, 2012).

SUMMARY

Contrived to solve the aforementioned problems, the present invention provides an apparatus for repelling birds that can be readily installed and can fundamentally keep the birds from approaching.

The present invention also provides an apparatus for repelling birds that can be readily installed and securely fixed on a steel structure, such as a bridge, which is vibrated periodically.

The present invention provides an apparatus for repelling birds that can be readily maintained by adjusting a tension of a wire.

An apparatus for repelling birds in accordance with an embodiment of the present invention includes: a fastening means including a first supporting part, a second supporting part and a fastening part interposed between the first supporting part and the second supporting part, and having the first supporting part and the second supporting part protruded in a same direction from either end of the fastening part in such a way that a protruded structure is fitted therein; a stopper being engaged with one of the first supporting part and the second supporting part in such a way that the fastening means is fastened to the structure after the fastening means is fitted on the structure, the stopper being at least one bolt; a supporting means being installed on the fastening means; a wire having at least one end coupled to the supporting means; and a tension adjusting means being installed at a portion where the wire is coupled with the supporting means. Here, the tension adjusting means may include: a spring being coupled to the wire; and a length adjusting screw being coupled with the wire and the supporting means for adjustment of length. The fastening means may have an elongated hole formed therein in such a way that the supporting means is movably installed therein, and the supporting means may have a fastening nut coupled thereto for fastening the supporting means to the elongated hole.

The wire may have one end thereof fixed to an upper portion of the supporting means, be connected alternately with a neighboring supporting means in a descending zigzag fashion, and have the other end thereof fixed to a lower portion of one of the two supporting means, and The tension adjusting means may be installed between the other end of the wire and the supporting means.

The length adjusting screw may have one end thereof coupled to the wire and the other end thereof length-adjustably coupled to the supporting means.

The length adjusting screw may have one end thereof coupled to the spring coupled to the wire and the other end thereof length-adjustably coupled to the supporting means. The apparatus for repelling birds in accordance with the present invention may be readily installed on and securely fixed to a steel structure, such as a bridge, thereby providing an improved bird-repelling effect.

The apparatus for repelling birds according to the present invention may have the wire repositioned depending on the surroundings after the apparatus for repelling birds is installed on the structure, thereby allowing for an easier maintenance.

Moreover, owing to the tension adjusting means, the apparatus for repelling birds according to the present invention may keep the wire in a taut state to improve the bird-repelling effect and keep the birds from being wounded by being caught between the wires, thereby assisting in the efforts for animal protection.

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in a singular form include a meaning of a plural form.

In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, some embodiments of an apparatus for repelling birds will be described in detail with reference to the accompanying drawings. Identical or corresponding elements will be given the same reference numerals, regardless of the figure number, and any redundant description of the identical or corresponding elements will not be repeated. Throughout the description of the present invention, when describing a certain relevant conventional technology is determined to evade the point of the present invention, the pertinent detailed description will be omitted.

Figure 1:
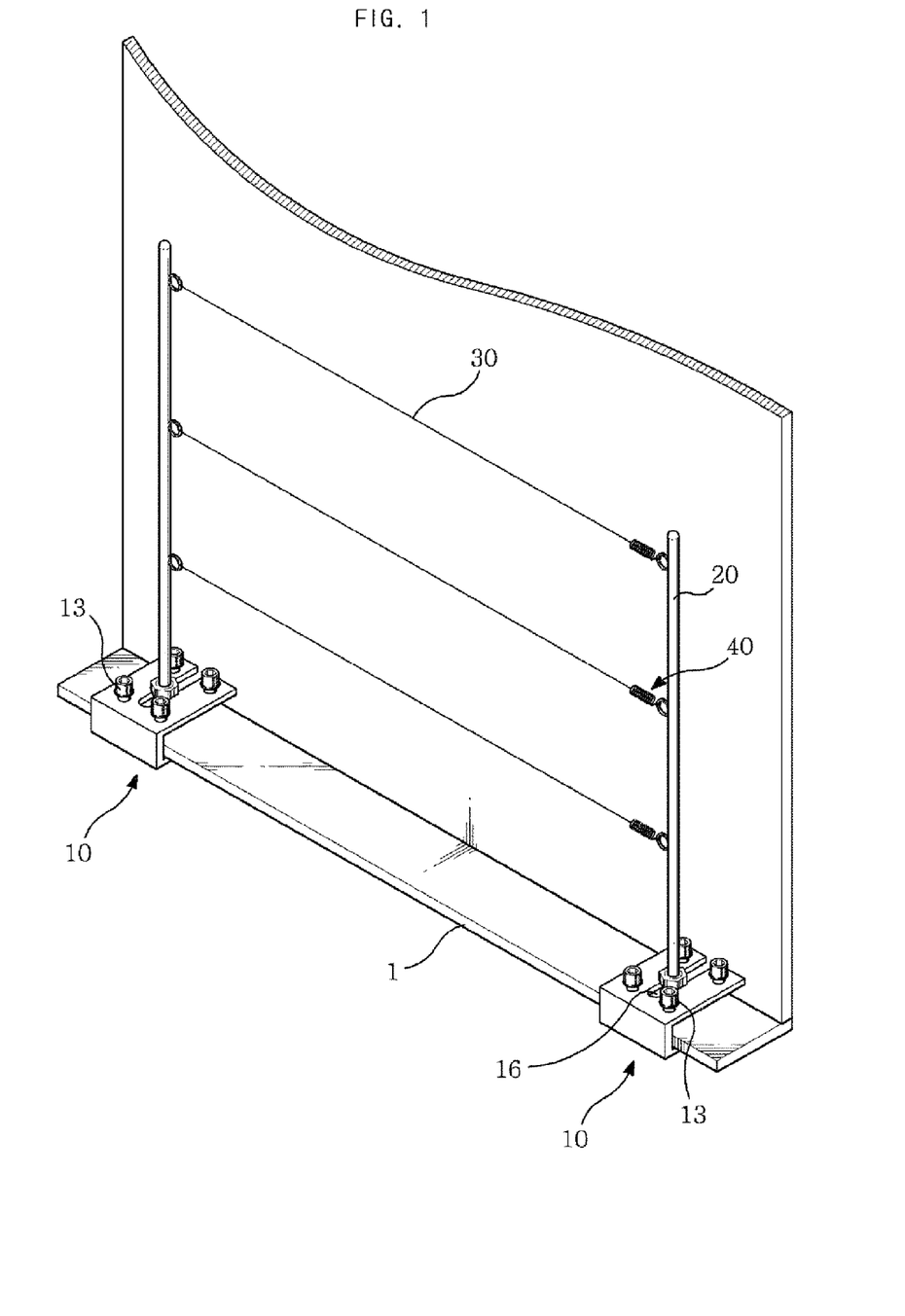
FIG. 1 is a perspective view showing an apparatus for repelling birds in accordance with a first embodiment of the present invention.
Figure 2:
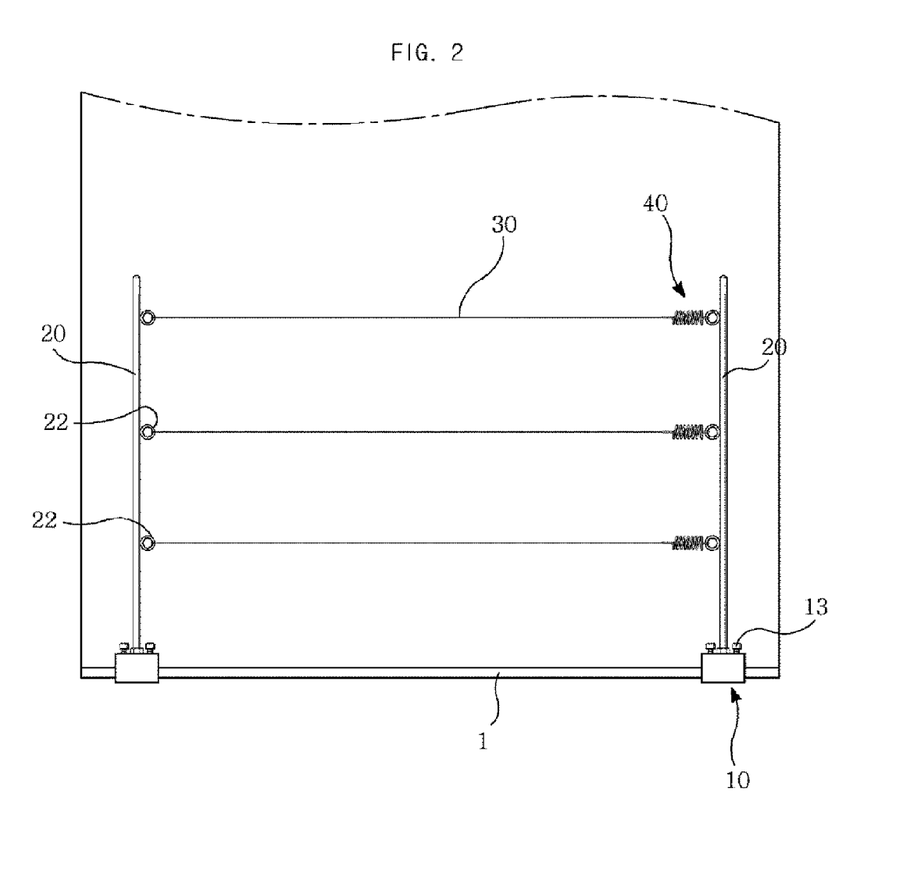
FIG. 2 illustrates how the apparatus for repelling birds shown in FIG. 1 is installed.
Figure 3:
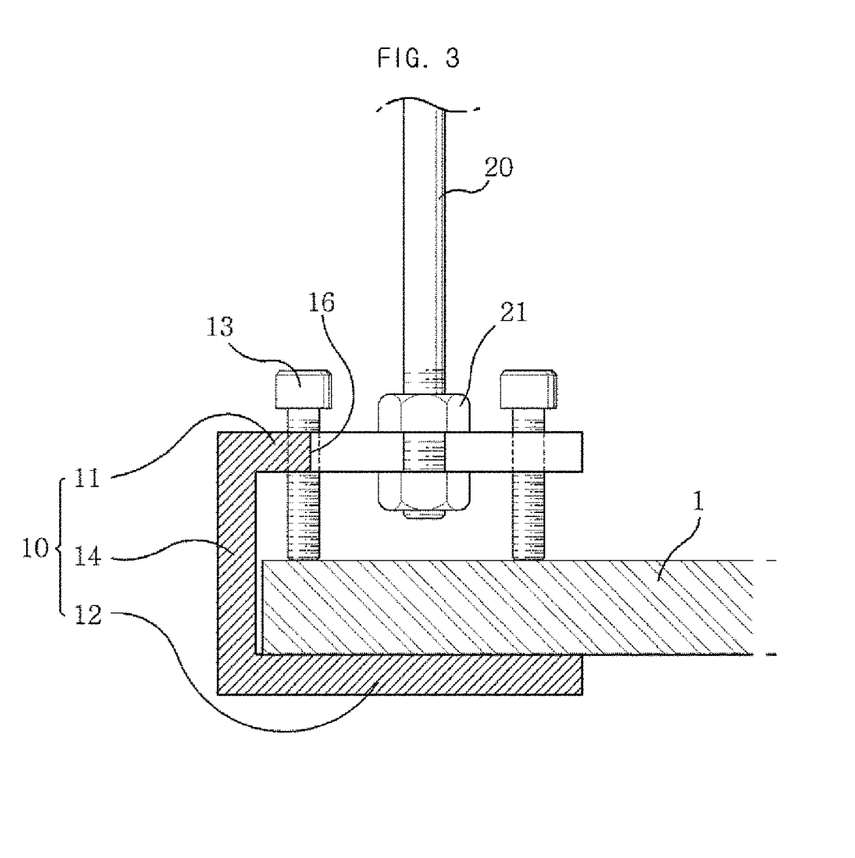
FIG. 3 is a cross-sectional view of a fastening means shown in FIG. 1.

FIG. 1 is a perspective view showing an apparatus for repelling birds in accordance with a first embodiment of the present invention, and FIG. 2 illustrates how the apparatus for repelling birds shown in FIG. 1 is installed. FIG. 3 is a cross-sectional view of a fastening means shown in FIG. 1. As illustrated herein, the apparatus for repelling birds is a device for keeping pigeons from perching on a bridge or a steel structure. While the apparatus for repelling birds may be installed on any structure, such as a street light or a telephone pole, which needs to repel birds, it will be described herein that the apparatus for repelling birds is installed on a bridge, for the convenience of description and understanding.

As illustrated in FIG. 1 to FIG. 3, the apparatus for repelling birds in accordance with an embodiment of the present invention is constituted with at least two fastening means 10 installed on a structure 1, supporting means 20 installed, respectively, on the fastening means 10, and a wire 30 having both ends thereof connected, respectively, to neighboring supporting means 20. The wire 30 refers collectively to any linear member having a predetermined length and may preferably be a piano wire or a fishing line. In the present invention, the piano wire or fishing line used for the wire 30 may be substituted by any linear member, such as a thread, a rope or a steel wire, having a predetermined length for preventing pigeons from perching thereon.

The structure 1, which has a predetermined width and thickness and is protruded in a plate shape in a lengthwise direction, is commonly formed in a steel structure, such as a bridge, on which pigeons often perch. The apparatus for repelling birds in accordance with an embodiment of the present invention may be installed on any plate-shaped member having a sufficient width and length for the birds to perch on.

The fastening means 10 is constituted with a fastening part 14, of which a width is greater than the thickness of the structure 1, and a first supporting part 11 and a second supporting part 12, which are protruded in one direction from either end portion of the fastening part 14. While it is possible that the first supporting part 11 and the second supporting part 12 are formed to be slightly smaller than the thickness of the structure 1 in such a way that the structure 1 is press-fitted in between the first supporting part 11 and the second supporting part 12, it is preferable that, as shown in FIG. 3, the first supporting part 11 and the second supporting part 12 are formed in such a way that a gap between the first supporting part 11 and the second supporting part 12 is greater that the thickness of the structure 1 and the first supporting part 11 has a stopper 13 installed therein for engagement toward the structure 1. The stopper 13 functions to fasten the fastening means 10 to the structure 1. While the supporting means 20 may have one stopper 13 engaged therein, it is preferable that, as illustrated herein, four stoppers 13 are engaged. Since bridges are prone to vibrations due to, for example, traffic, the apparatus for repelling birds may be damaged due to the vibrations unless the apparatus for repelling birds is securely fixed using the stopper 13.

The first supporting part 11 has an elongated hole 16 formed therein that is penetrated in an orthogonal direction to a direction in which the wire 30 is arranged.

The supporting means 20 has a fastening nut 21 coupled to an end thereof for fastening the supporting means 20 to the elongated hole 16. It is possible that there are two fastening nuts 21 coupled to the end of the supporting means 20 or that a flange that looks like a bolt head is formed at the end of the supporting means 20 and a single fastening nut 21 is coupled thereto. It is preferable that a gap between the first supporting part 11 and the structure 1 is minimal as long as there is a sufficient space in which the fastening nut 21 or the flange is formed. It is possible that there are multiple supporting means 20 installed depending on a width of the structure 1 or that the supporting means 20 is installed at various locations in order to make it difficult for the pigeons to perch on. That is, in case the structure is wide, the pigeons may perch on an edge region of the structure, and thus the supporting means 20 may be positioned differently or a multiple number of supporting means 20 may be installed.

The supporting means 20 may be formed in the shape of a rod having a predetermined length and may have the fastening nut 21 engaged to one end thereof for fastening to the elongated hole 16 of the fastening means 10. The supporting means 20 is equipped with a fastening part 22 so as to maintain a fastening position of the wire 20.

Figure 4:
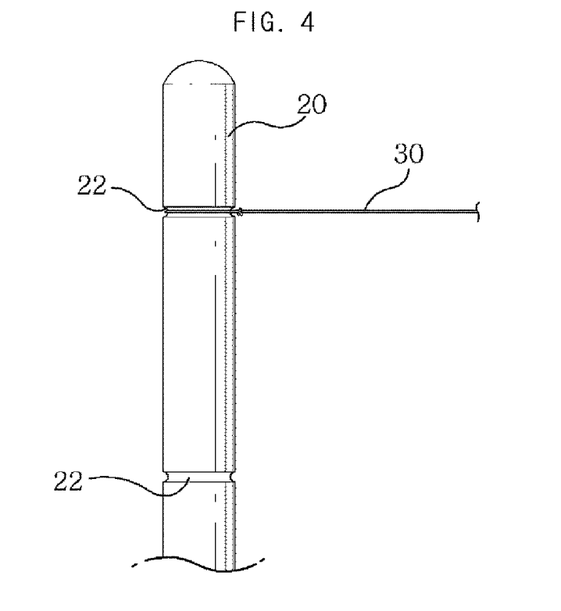
FIG. 4 is a side view showing a supporting means of an apparatus for repelling birds in accordance with a second embodiment of the present invention.
Figure 5:
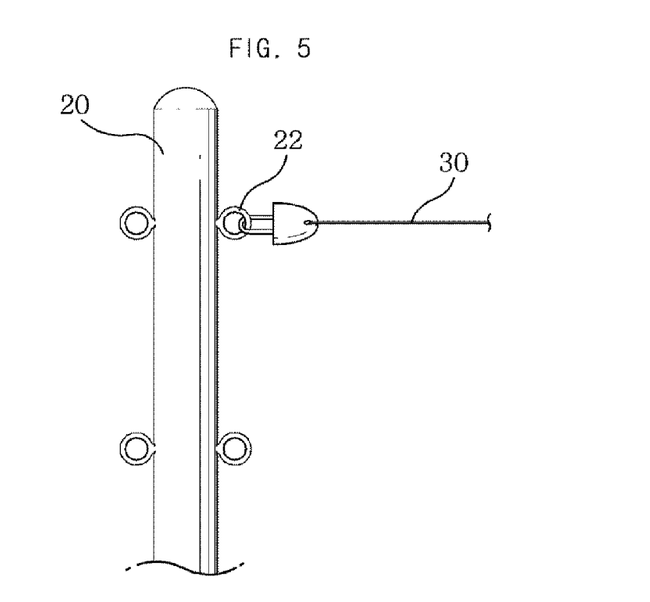
FIG. 5 is a side view showing a supporting means of an apparatus for repelling birds in accordance with a third embodiment of the present invention.
Figure 6:
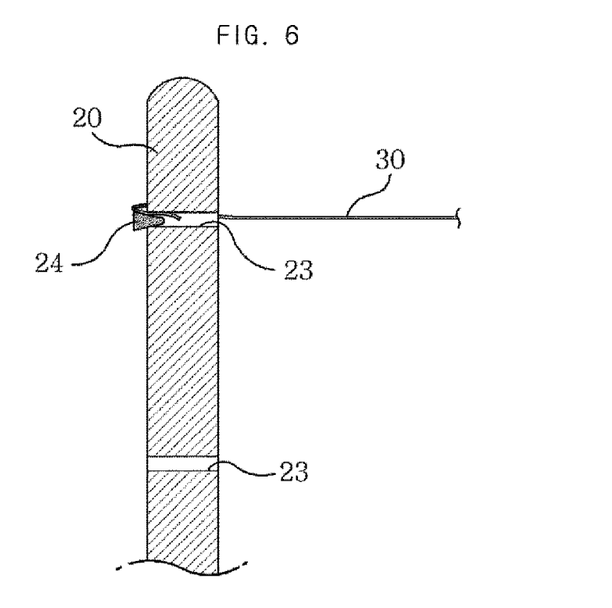
FIG. 6 is a side view showing a supporting means of an apparatus for repelling birds in accordance with a fourth embodiment of the present invention.

The fastening part 22, which is configured for fastening the wire 30, may be formed in the shape of rings that are attached to the supporting means 20 at regular intervals in a lengthwise direction, as shown in FIG. 2. Alternatively, as shown in FIG. 4, the fastening part 22 in accordance with a second embodiment of the present invention may be formed in the shape of grooves that are each caved in along a circumferential surface of the fastening means 20. Alternatively, as shown in FIG. 5, the fastening part 22 in accordance with a third embodiment of the present invention may be formed in the shape of rings that are attached to the supporting means 20 at regular intervals in a lengthwise direction, and a connecting link may be formed on each wire 30 for engagement with the ring-shaped fastening part 22. Alternatively, as shown in FIG. 6, the fastening part 22 in accordance with a fourth embodiment of the present invention may have a wedge groove 23 formed thereon, and the wire 30 may be fastened by pressing a wedge 24 against the wedge groove 23 while an end portion of the wire 30 is inserted in the wedge groove 23. The wedge groove 23 may be formed in a caved-in shape with a predetermined depth.

As illustrated in FIG. 2, the wire 30 has a tension adjusting means 40 connected to the other end thereof, and the tension adjusting means 40 is connected to the fastening part 22 of the supporting means 20. The tension adjusting means 40 may be constituted with a spring 41 or a length adjusting screw 42 or a combination of the spring 41 and the length adjusting screw 42. Although it is illustrated in FIG. 2 that the fastening parts 22 are installed in one direction only, a plurality of the fastening parts 22 may be arranged in multiple directions on the supporting means 20 in such a way that multiple rows of the fastening parts 22 are formed on the supporting means 20. For example, in the case where the fastening parts 22 are arranged in two columns that are separated by 180 degrees about a center axis of the supporting means 20, two wires 20 may be installed, with a separation of 180 degrees, on one supporting means 20. The angle of installing the fastening parts 22 may be selectively adjusted by an operator, depending on an environment in which the apparatus for repelling birds is installed.

The apparatus for repelling birds in accordance with an embodiment of the present invention having the above-described configurations is installed on a structure of a bridge that is in the shape of a plate having a predetermined width and length.

The structure 1 is engaged by the fastening means 10 and then by the stopper 13, which functions to fasten the fastening means 10 to the structure 1. After installing at least two fastening means 10, the wire 30 is installed on the supporting means 20. One end of the wire 30 is directly connected to the supporting means 20, and the other end of the wire 30 is connected to the tension adjusting means 40, and then the other end of the tension adjusting means 40 is connected to the supporting means 20.

The number of wires 30 may vary, but preferably between 3 and 5, depending on the environment of installation.

The wire 30 contracts in the winter and thus may maintain a taut state in the winter, but the wire 30 expands in the summer and thus may become loose in the summer. The wire 30 may maintain the taut state by use of the tension adjusting means 40. Specifically, as the tension adjusting means 40 contract by as much as the expanded wire 30, the wire 30 may maintain the taut state. While the tension adjusting means 40 allows the wire 30 to maintain the taut state and perform the function of effectively preventing pigeons and other birds from perching thereon, the tension adjusting means 40 allows the birds to escape from the wire in case the birds are caught in between the wires 30. For example, in a pressing situation where a pigeon is entangled in between the wires 30, the pigeon may escape from the wires 30 by itself by overcoming the elastic limit of the tension adjusting means 40.

Figure 7:
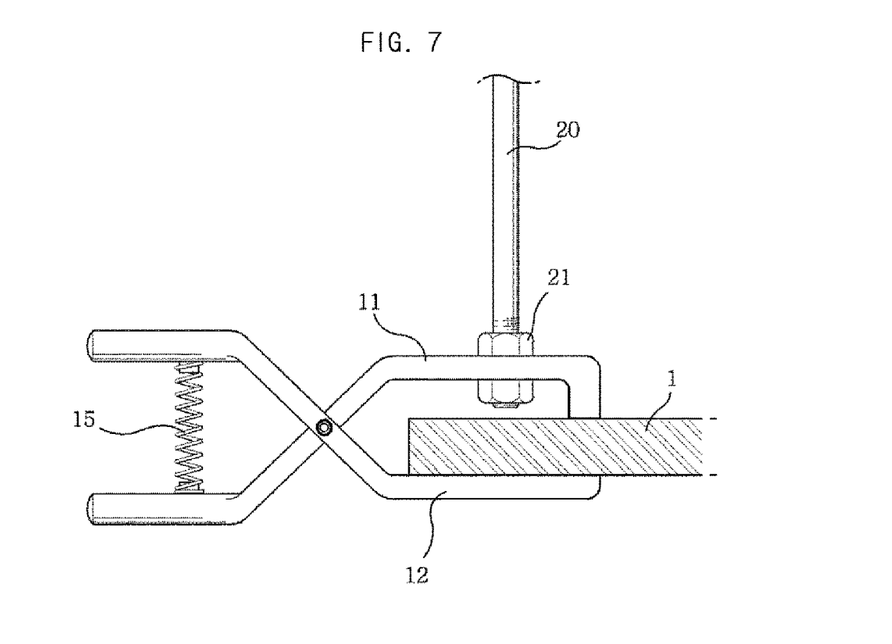
FIG. 7 is a cross-sectional view showing a fastening means of an apparatus for repelling birds in accordance with a fifth embodiment of the present invention.

Similarly, in an apparatus for repelling birds in accordance with a fifth embodiment of the present invention, the first supporting part 11 and the second supporting part 12 have an elastic member 15 installed thereon for generating a pressing force toward the structure 1.

The fastening means 10 is formed in the shape of a pair of tongs by intersecting and hinge-coupling the first supporting part 11 and the second supporting part 12 with each other and extending respective end portions of the first supporting part 11 and the second supporting part 12. The elastic member 15 is installed at a portion of the fastening means 10 that is opposite to a portion of the fastening means 10 where the first supporting part 11 and the second supporting part 12 are formed. The elastic member 15 is installed in a compressed state so as to generate an elastic force for the first supporting part 11 and the second supporting part 12 to be pressed against the structure 1. In the case where the supporting means 20 is installed on the first supporting part 11, it is preferable that the first supporting part 11 has an elongated hole formed therein for installation of the supporting means 20 and that a gap-forming protrusion, as shown in FIG. 7, is formed at an end portion of the first supporting part 11 so as to provide a sufficient space for installing the supporting means 20.

The construction and operation of the apparatus for repelling birds in accordance with the present embodiment are unchanged from those of the apparatus for repelling birds in accordance with the first embodiment of the present invention, except for the fastening means 10.

Figure 8:
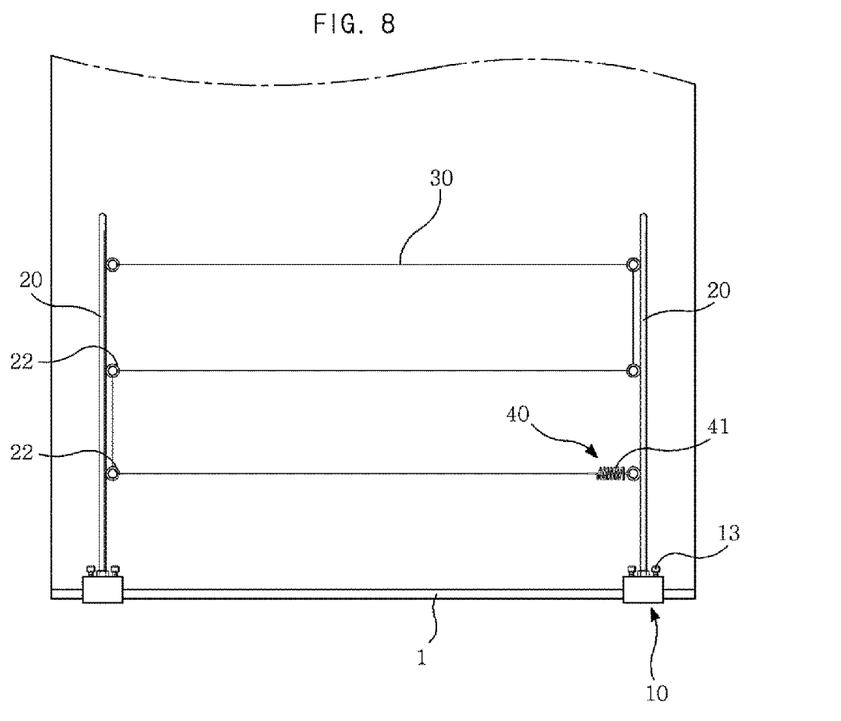
FIG. 8 illustrates how the apparatus for repelling birds in accordance with the sixth embodiment of the present invention is installed.

As illustrated in FIG. 8, in an apparatus for repelling birds in accordance with a sixth embodiment of the present invention, the wire 30 has one end thereof coupled to the fastening part 22 at an upper side of the supporting means 20, is connected alternately with the neighboring supporting means 20 in a descending zigzag fashion, and ultimately has the other end thereof fixed to a lower side of the neighboring supporting means 20. Here, the tension adjusting means 40 is installed between the wire 30 and the supporting means 20.

The reason why the tension adjusting means 40 is installed on the other end of the wire 30 that is placed at the lower side of the supporting means 20, as illustrated in FIG. 8, is that the wire 30 placed at the lower side of the supporting means 20 plays the most important role in preventing the birds from perching thereon. Accordingly, it is important for the wire 30 on the lower side of the supporting means 20 to maintain the taut state, and thus the tension adjusting means 40 is installed on the other end of the wire 30. Although not illustrated, it is also possible in the present invention that the tension adjusting means 40 is installed in the middle or on the one end of the wire 30.

Other than the configuration of the single wire 30 connected alternately to the supporting means 20 in the zigzag fashion, the construction and operation of the apparatus for repelling birds in accordance with the present invention are unchanged from those of the apparatus for repelling birds in accordance with the first embodiment of the present invention.

Figure 9:
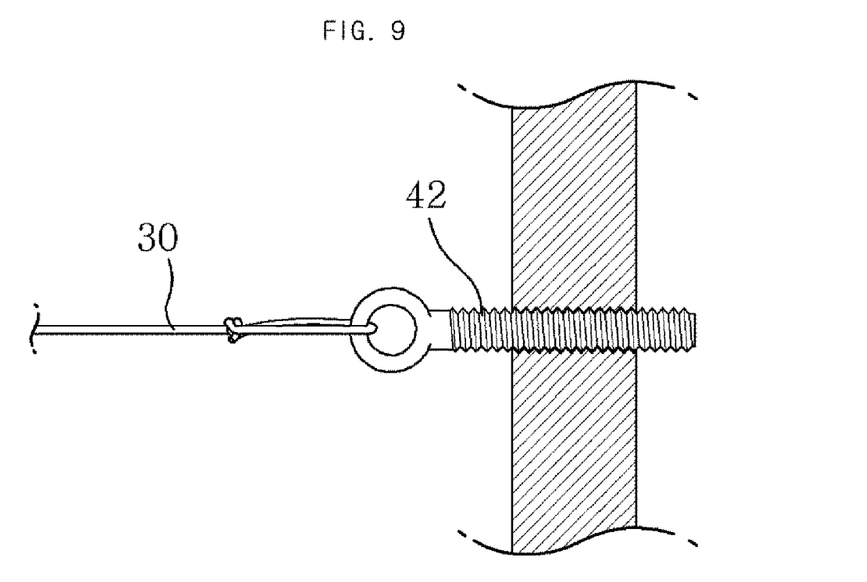
FIG. 9 is a side view showing a tension adjusting means of an apparatus for repelling birds in accordance with a seventh embodiment of the present invention.

In an apparatus for repelling birds in accordance with a seventh embodiment of the present invention shown in FIG. 9, the tension adjusting means 40 is constituted with a length adjusting screw 42. The length adjusting screw 42 has a head thereof connected to the wire 30 and a body thereof engaged with female threads formed in the supporting means 20. If the wire 30 becomes loose, the length adjusting screw 42 may be screwed in further until the wire 30 becomes taut, and if the wire 30 becomes too tight, the length adjusting screw 42 may be screwed out to adjust the tension of the wire 30. The length adjusting screw 42 may be coupled with the female threads formed in the supporting means 20, as shown in FIG. 9, or may be inserted into a through-hole formed in the supporting means 20 and then coupled with nuts 45 on either end of the length adjusting screw 42 about the supporting means 20, as shown in FIG. 11.

Figure 10:
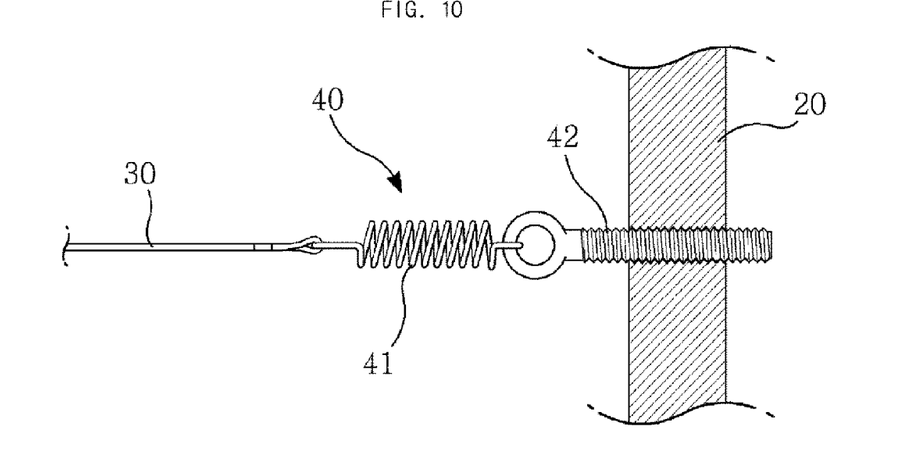
FIG. 10 is a side view showing a tension adjusting means of an apparatus for repelling birds in accordance with an eighth embodiment of the present invention.

In an apparatus for repelling birds in accordance with an eighth embodiment of the present invention illustrated in FIG. 10, the tension adjusting means 40 is configured with a combination of a spring 41 and a length adjusting screw 42. The other end of the wire 30 is connected to the spring 41, and the spring 41 is then connected to a head of the length adjusting screw 42. The body of the length adjusting screw 42, to which the spring 41 is connected, is coupled with female threads formed in the supporting means 20.

Figure 11:
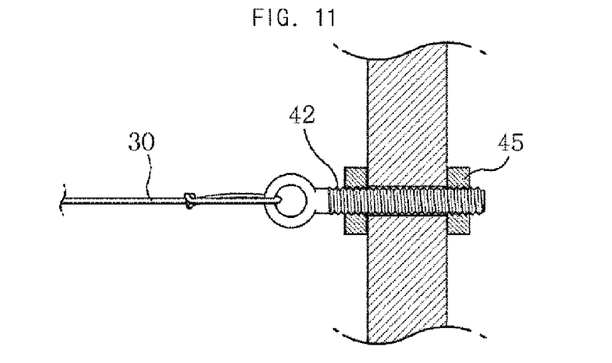
FIG. 11 is a side view showing a tension adjusting means of an apparatus for repelling birds in accordance with a ninth embodiment of the present invention.

In an apparatus for repelling birds in accordance with a ninth embodiment of the present invention shown in FIG. 11, the length adjusting screw 42 is inserted into a through-hole formed in the supporting means 20 and then coupled with nuts 45 on either end of the length adjusting screw 42 about the supporting means 20. Moreover, the present embodiment includes a spring 41 interposed between the length adjusting screw 42 and the wire 30. It is preferable that the length adjusting screw 42 has a sufficient length of threads formed thereon so as to adjust the length thereof adequately.

Figure 12:
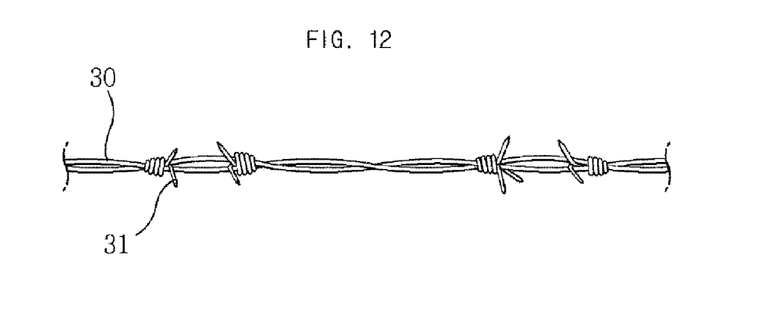
FIG. 12 is a side view showing a wire of an apparatus for repelling birds in accordance with a tenth embodiment of the present invention.

In an apparatus for repelling birds in accordance with a tenth embodiment of the present invention shown in FIG. 12, the wire 30 is formed by twisting two wires with barbs 31 placed at regular intervals. The barbs 31 may be formed by sharply cutting a separate wire and entwining the sharply-cut wire on the wire 30. For example, the barbs 31 may be formed in a similar structure as the barbed wire used in a ranch. Preferably, the barbs 31 may be installed at intervals of 10-15 cm. Other than using the wire 30 having the barbs 31 entwined thereon, the construction and operation of the apparatus for repelling birds in accordance with the present invention are unchanged from those of the apparatus for repelling birds in accordance with the first embodiment of the present invention.

As described above, the apparatus for repelling birds in accordance with the present invention uses the piano wire as the wire thereof and is installed in an area frequented by pigeons to fundamentally preventing the pigeons from perching on a structure. As the pigeons are kept apart, the steel structures, such as the bridges, may not be corroded or have their appearances ruined.

Moreover, as the elongated hole formed in the fastening means allows the supporting means 20 to be moved in a widthwise direction of the structure, the supporting means 20 may be repositioned according to the surroundings, for example, the width of the structure, or multiple supporting means 20 may be installed in the elongated hole if the structure is too wide, thereby effectively preventing the birds from approaching the structure.

Moreover, by installing the tension adjusting means on the wire, the length of the wire may be compensated even if the wire expands and contracts seasonally, allowing the wire to constantly maintain a taut state and enhance the bird repelling effect. The tension adjusting means is made in such a way that the wire is given an elasticity to maintain its taut state and the pigeons are allowed to overcome the elasticity of the tension adjusting means to escape from the wires by themselves in case they are caught in between the wires. Therefore, the apparatus for repelling birds in accordance with the present invention may assist in the efforts for animal protection.

As a single wire may be installed in a zigzag fashion between two supporting means, installation may be readily made, and the manufacturing costs may be saved.

Furthermore, the fastening means 10 is constituted with the first supporting part 11 and the second supporting part 12 that form the shape of "C" with a predetermined gap therebetween to be press-fitted on the structure or to be coupled with the stopper 13 while the fastening means 10 is installed on the structure, allowing the fastening means 10 to be securely fastened to the structure. This is especially important when the fastening means 10 is installed on the structure such as a bridge, which is constantly prone to vibrations due to, for example, traffic thereon. Securing the fastening means 10 on the bridge y way of a simple press-fitting may have the fastening means 10 repositioned on the structure or detached from the structure due to the prolonged vibrations. In other words, there is a possibility that the fastening power may not be sustained any longer.

The stopper 13 plays an important role in keeping the fastening means 10 from breaking away from the installation position on the vibrating structure.

Although certain embodiments of the present invention have been described, it shall be appreciated that there can be a very large number of permutations and modification of the present invention by those who are ordinarily skilled in the art to which the present invention pertains without departing from the technical ideas and scope of the present invention, which shall be defined by the claims appended below. It shall be also appreciated that many other embodiments than the embodiments described above are included in the claims of the present invention.

What is claimed is:

1. An apparatus for repelling birds, comprising:
   a fastening means comprising a first supporting part, a second supporting part and a fastening part interposed between the first supporting part and the second supporting part, and having the first supporting part and the second supporting part protruded in a same direction from either end of the fastening part in such a way that a protruded structure is fitted therein;
   a stopper being engaged with one of the first supporting part and the second supporting part in such a way that the fastening means is fastened to the structure after the fastening means is fitted on the structure, the stopper being at least one bolt;
   a supporting means being installed on the fastening means;
   a wire having at least one end coupled to the supporting means; and
   a tension adjusting means being installed at a portion where the wire is coupled with the supporting means,
   wherein the tension adjusting means comprises: a spring being coupled to the wire; and a length adjusting screw being coupled with the wire and the supporting means for adjustment of length, and
   wherein the fastening means has an elongated hole formed therein in such a way that the supporting means is movably installed therein, and the supporting means has a fastening nut coupled thereto for fastening the supporting means to the elongated hole.

2. The apparatus of claim 1, wherein the wire has one end thereof fixed to an upper portion of the supporting means, is connected alternately with a neighboring supporting means in a descending zigzag fashion, and has the other end thereof fixed to a lower portion of one of the two supporting means, and
   wherein the tension adjusting means is installed between the other end of the wire and the supporting means.

3. The apparatus of claim 1, wherein the length adjusting screw has one end thereof coupled to the wire and the other end thereof length-adjustably coupled to the supporting means.

4. The apparatus of claim 1, wherein the length adjusting screw has one end thereof coupled to the spring coupled to the wire and the other end thereof length-adjustably coupled to the supporting means.

* * * * *